United States Patent
Kumar et al.

(10) Patent No.: US 11,321,549 B2
(45) Date of Patent: May 3, 2022

(54) METHOD FOR EXTENDING THE RANGE OF COMMERCIAL PASSIVE RFID ELEMENTS

(71) Applicant: CARNEGIE MELLON UNIVERSITY, Pittsburgh, PA (US)

(72) Inventors: Swarun Kumar, Pittsburgh, PA (US); Haojian Jin, Pittsburgh, PA (US); Jingxian Wang, Pittsburgh, PA (US); Junbo Zhang, Pittsburgh, PA (US); Rajarshi Saha, Pittsburgh, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 0 days.

(21) Appl. No.: 17/092,575

(22) Filed: Nov. 9, 2020

(65) Prior Publication Data
US 2021/0142013 A1    May 13, 2021

Related U.S. Application Data

(60) Provisional application No. 62/931,880, filed on Nov. 7, 2019.

(51) Int. Cl.
| | |
|---|---|
| *G06K 7/08* | (2006.01) |
| *G06K 7/10* | (2006.01) |
| *G06K 19/07* | (2006.01) |
| *H04L 67/10* | (2022.01) |

(52) U.S. Cl.
CPC ..... *G06K 7/10475* (2013.01); *G06K 19/0723* (2013.01); *H04L 67/10* (2013.01)

(58) Field of Classification Search
CPC .................. G06K 7/10475; G06K 19/0723
USPC .............................................. 235/451
See application file for complete search history.

(56) References Cited

U.S. PATENT DOCUMENTS

| | | | |
|---|---|---|---|
| 10,025,960 B1* | 7/2018 | Fink | G06K 7/10069 |
| 11,048,890 B2* | 6/2021 | Khojastepour | G06K 7/10356 |
| 2007/0210960 A1* | 9/2007 | Rofougaran | H01Q 3/26 |
| | | | 342/368 |
| 2008/0012710 A1* | 1/2008 | Sadr | H01Q 25/00 |
| | | | 340/572.1 |
| 2011/0080267 A1* | 4/2011 | Clare | G01S 13/82 |
| | | | 340/10.4 |

* cited by examiner

*Primary Examiner* — Ahshik Kim
(74) *Attorney, Agent, or Firm* — Kacvinsky Daisak Bluni PLLC

(57) ABSTRACT

A system that exploits collaboration between a plurality of spatially distributed RFID readers to enhance the range of commercial passive RFID tags, without alteration to the tags. The system uses distributed MIMO to coherently combine signals across geographically separated RFID readers. It is capable of inferring the optimal beamforming parameters to beam energy to a tag without any initial knowledge of the location or orientation of the tags.

16 Claims, 12 Drawing Sheets

Algorithm 1 Gradient-Based Beamforming Vector Pruning

1: B : random beamforming vectors. $t = 1, ..., N$. $D_i$: energy of the set of points which could be covered by the $i$-th beamforming vector $B_i$.

Loop:

2: $Q \leftarrow |\bigcup_i^t D_i|$, where $Q$ represents the number of points covered in G by the beamforming vector set B

3: $g^{(t)} \leftarrow \nabla_\mathbf{B}(Q)$

4: $E[g^2]^{(t)} \leftarrow \gamma E[g^2]^{(t-1)} + (1-\gamma)g^{(t)^2}$

5: $\Delta\mathbf{B}^{(t)} \leftarrow -\frac{RMS[\Delta\mathbf{B}]^{(t-1)}}{RMS[g]^{(t)}} g^{(t)}$ 6: $\mathbf{B} \leftarrow \mathbf{B} + \Delta\mathbf{B}$ while $Q < threshold$ return $\arg\max_\mathbf{B} Q$

*FIG. 4*

(a)
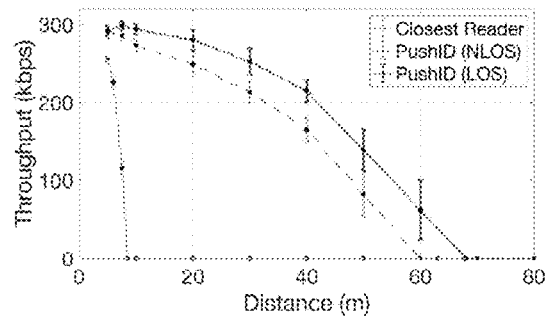
(b)
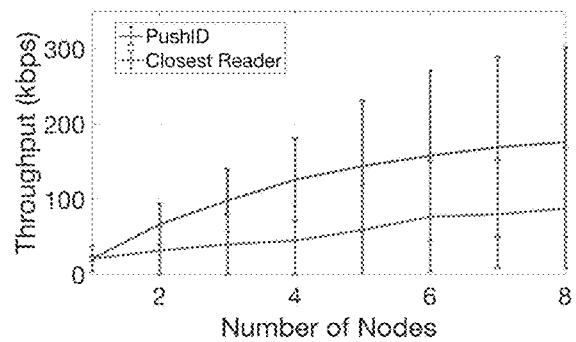
(c)
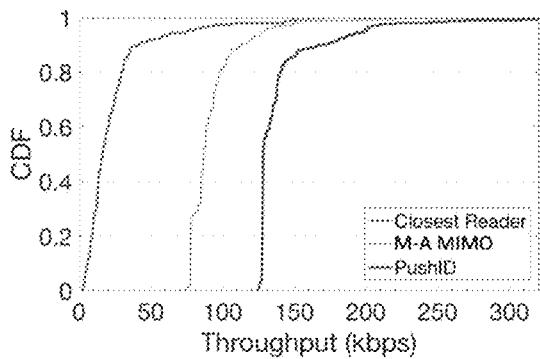
FIG. 11

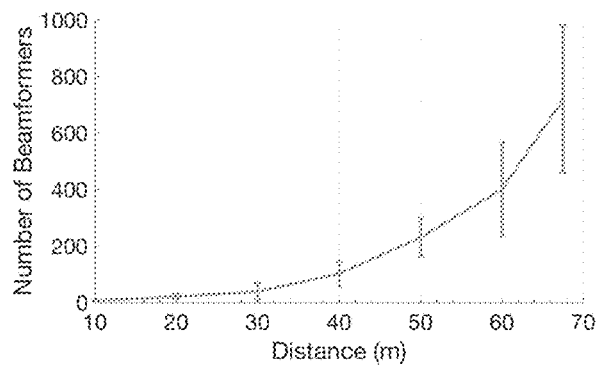
(a)
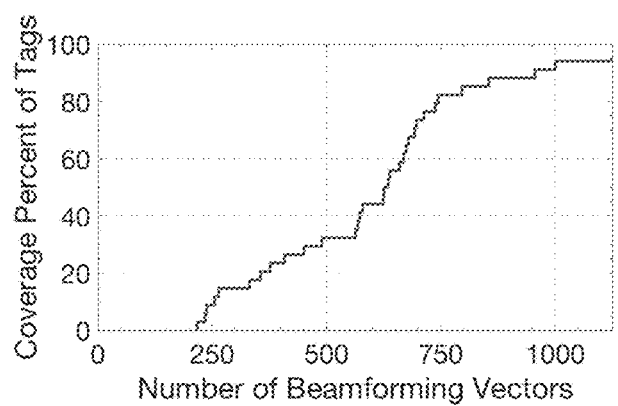
(b)
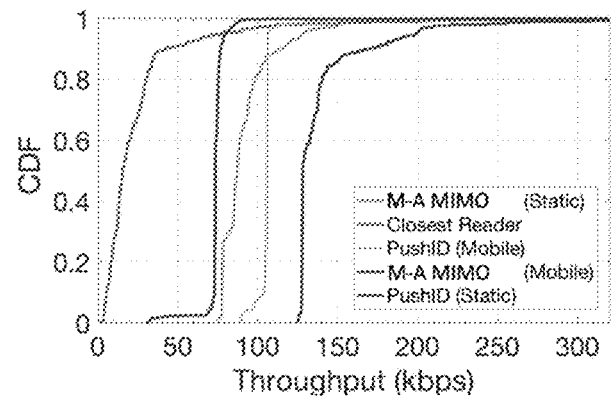
(c)
FIG. 12

METHOD FOR EXTENDING THE RANGE OF COMMERCIAL PASSIVE RFID ELEMENTS

RELATED APPLICATIONS

This application claims the benefit of U.S. Provisional Patent Application No. 62/931,880, filed Nov. 7, 2019, the contents of which are incorporated herein in their entirety.

GOVERNMENT INTEREST

This invention was made with U.S. government support under contract CNS 1718435, awarded by the National Science Foundation (NSF). The U.S. government has certain rights in the invention.

BACKGROUND OF THE INVENTION

Typical, prior art passive commercial RFID tags have a maximum range of about 5-15 meters. This limited range is due to several factors, including their limited cost, form-factor, and the FCC-mandated power limits of the RFID readers they harvest energy from. In many factories and warehouses, RFID-tagged products can only be detected around specific checkpoints in the vicinity of an RFID reader and are virtually undetectable at other points in between. Further, recent innovation on RFID-based localization and sensing remain constrained to a few meters around each reader in these large spaces.

Therefore, it would be desirable to be able to increase the range limits of commercial passive RFID tags without increasing the prevailing density of deployment of RFID readers, and, in particular, to do so without modifying the RFID tags in any way by adding to cost and complexity, relays or requiring batteries. It is further desirable to avoid the use of sophisticated multi-antenna or directional RFID readers that can expand range yet are vulnerable to obstacles and limited by FCC transmit power limits. More importantly, such systems require commercial RFIDs that are linearly polarized to be carefully oriented towards their location to harvest sufficient energy.

SUMMARY OF THE INVENTION

Disclosed herein are systems and methods comprising the present invention which use distributed multiple-input, multiple-output (MIMO) beamforming to increase the communication range of commercial passive RFID tags. The invention synchronizes both transmissions and receptions from multiple, spatially distributed RFID readers to beamform power to RFID tags that may be up to several tens of meters away from any individual reader. In addition, the invention exploits the diversity in location and polarization of readers to further improve range.

A detailed experimental evaluation on an eight-reader, distributed multi-antenna testbed revealed that the invention achieves a 7.4× improvement in range compared to state-of-the-art commercial readers and 20% over the mean of distance improvement, even when compared to 8-antenna MIMO reader arrays, all while remaining compliant with FCC power limits for the readers.

The main goal of the invention is to find optimal beamforming weights to beam power to an RFID tag at an unknown location and orientation in an area of interest about which multiple RFID readers have been deployed. Because RFID systems are backscatter, optimal beamforming weights amplify the energy transmitted to and reflected back from any RFID tags present in the area of interest.

Considerations using channel reciprocity, where the optimal beamforming weights are inferred based on the wireless channels of signals from the RFID tag to the reader antennas, leads to a chicken-or-egg problem in the context of passive RFIDs. To emit a response, a passive RFID tag needs to harvest sufficient energy from the beamformed signal of the RFID reader antennas to become active. However, to perform accurate beamforming, the readers first need a response from the RFID tag to determine its location. Naively iterating over all possible beamforming weights could take considerable time to beamform power to one tag from a long distance.

The present invention resolves this dilemma by developing a novel distributed blind beamforming approach to efficiently search through the space of beamforming weights without a response from the tag. At a high level, the invention models the received signal power at each point in space for different beamforming weights applied across reader antennas. Sub-sets of 3D space where RFIDs placed would receive sufficient energy to respond are then identified. Unlike traditional beams of a directional antenna, in the context of distributed MIMO, the regions of space that receive sufficient energy are quite complex and span the entire 3D space as shown in FIG. 1(b). The invention is able to calculate the optimal beamforming weights while minimizing overlap within area of interest using a method analogous to the weighted set-cover problem, a well-known NP-complete problem.

The invention includes heuristic approximation algorithms to efficiently search the entire space for RFID tags under a limited time budget. A key challenge in ensuring minimal overlap between patterns is the unknown multipath characteristics of the environment, which can significantly change the energy patterns that beamforming weights produce. FIG. 3(c) shows how the energy pattern may be modified when a strong reflector is present. The approach of the invention to resolving this difficulty exploits responses from the RFID tags that are progressively detected as it applies various beamforming vectors. The invention uses these responses to better learn the nature and extent of multipath-richness in the environment. This iteratively improves ability of the invention to efficiently look for and power other tags in the environment.

A second key challenge the invention must resolve is achieving time and frequency synchronization across multiple distributed RFID readers to beamform coherently. The invention borrows from classic distributed MIMO architectures in the Wi-Fi context wherein one transmitter can be treated as the primary and can apply phase shifts to the remaining secondary transmitters to emulate signals from the primary.

In the RFID context, transmissions from the readers are significantly longer than Wi-Fi, causing phase drifts to accumulate, even within one packet from the reader. The invention resolves this by leveraging the full-duplex nature of RFID readers. Specifically, each secondary transmitter subtracts its own signal and tracks the drift in phase of a carefully chosen subset of remaining transmitters. It then uses these phase drifts to account for phase errors that accumulate within a packet dynamically. The method of the invention converges to tightly synchronized transmissions and receptions, even if some RFID readers are not in the range of the primary reader.

Experimental results using proof-of-concept implementations reveal that the invention achieves a maximum communication range of 64 m, an improvement of 7.4× that of commercial RFIDs and 20% over expensive 8-antenna MIMO. Even at short range, the invention achieves a mean throughput of 300 kbps at 8.5 meters (2.6× vs. commercial RFID). Lastly, the invention detects over 95% of the tags in a 140×140 m area, while commercial readers can detect tags no further than 8.5 m at best.

The invention is the first distributed MIMO system to power commercial passive RFID tags by using a novel blind distributed beamforming algorithm to efficiently search through the space of beamforming weights as well as a novel phase synchronization method for RFIDs.

BRIEF DESCRIPTION OF THE DRAWINGS

FIG. 4 is pseudocode of an algorithm for gradient-based beamforming vector pruning.

FIG. 11 are graphs showing throughput versus distance of the closest reader (a); number of readers (b); and CDF with changing tag orientation (c).

FIG. 12 are graphs showing the number of beamformers versus distance (a); percent of tags covered (b); and CDF of throughput with mobility (c).

DETAILED DESCRIPTION

As used herein, the terms "method", "invention" and "system" all refer to the novel systems and methods described herein.

The novel systems and methods of the invention powers and communicates with commercial passive RFID tags via RF-backscatter from a plurality of distributed commercial RFID readers, where the tags may be beyond the communication range of any single reader. This is achieved by coherently combining signals across distributed RFID readers to maximize the received signal power at one or more RFID tags, whose location and orientation are initially unknown. Because RFID systems operate based on RF-backscatter, the method applies beamforming weights both on the transmitted and received signals to maximize energy both to and from the RFID tags. The RFID readers are connected to a wired backhaul, which allows them to coordinate transmissions and data that needs to be transmitted on the downlink. Additionally, while the locations of the RFID readers are known, the number of RFID tags, their initial locations, their orientations and their environment are unknown.

Figure 2:
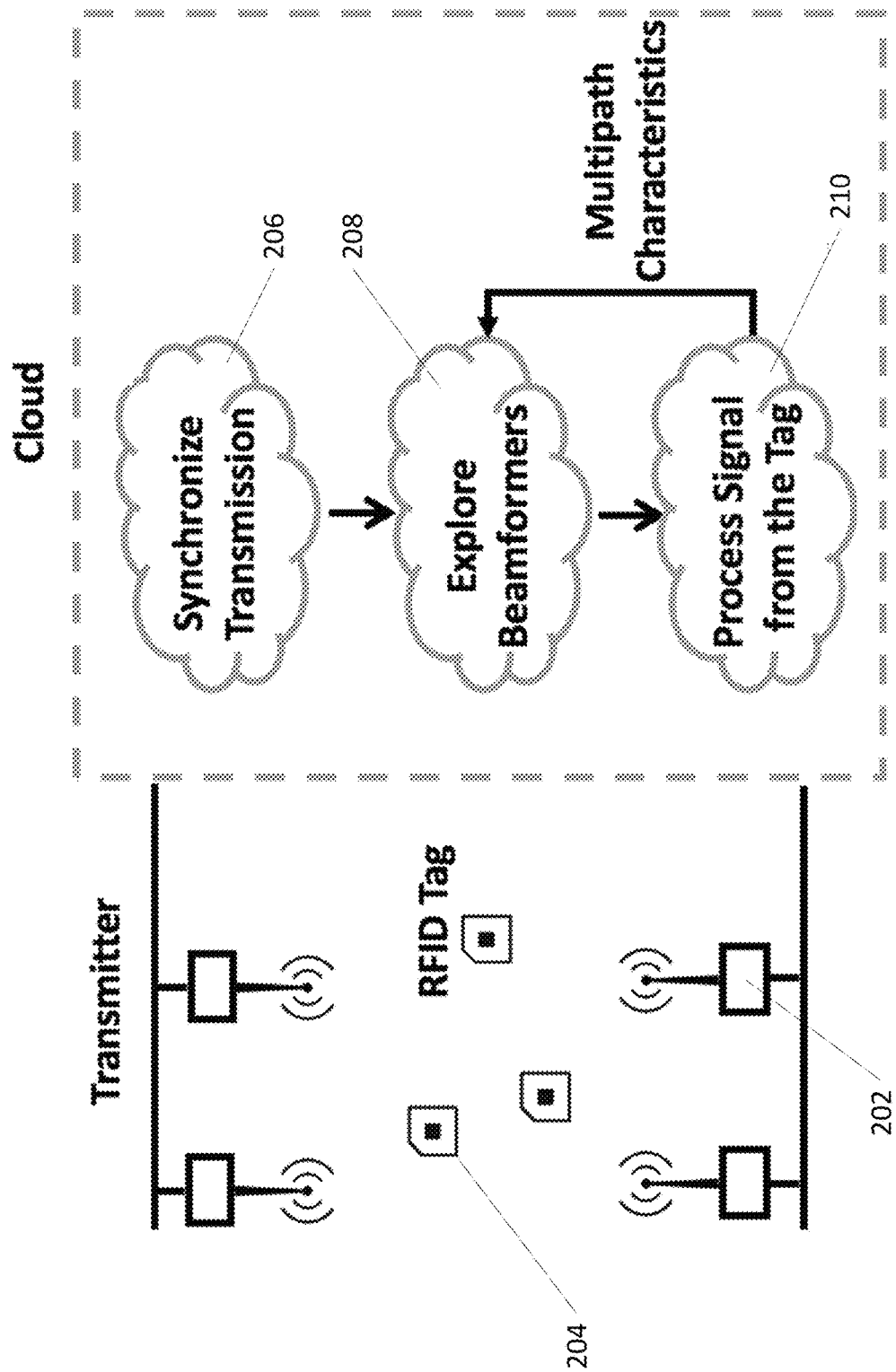
FIG. 2 is a block diagram showing the architecture of the present invention.

A high-level block diagram of the design of the system of the invention is shown in FIG. 2. All RFID readers 202 time and phase synchronize their transmissions on the air at 206 and iteratively apply various beamforming vectors at 208 in the hope of receiving responses from RFID tags 204 in the environment. The readers then collect responses from various RFID tags 204 in the environment and use the wireless channels they perceive in improving the search for other tags at 210. The readers 202 continue this process until sufficient confidence that the entire area of interest has been covered is achieved. To accomplish this, the invention optimizes the following (related) properties: (1) maximize the total number of RFIDs found within the coverage area under an overall time budget (which limits the number of beamforming vectors that can be iteratively attempted); and (2) maximize the throughput of signals from each tag.

There are two main aspects of the architecture of the invention. The method first needs to search through the beamforming space to identify optimal beamforming weights to iteratively search over to power RFID tags in the entire space. While this problem can be trivially addressed using channel reciprocity for RFID tags that are in range, the key challenge is that there may be tags that are outside the coverage area of any single reader. Therefore, the invention must identify the smallest set of beamforming weights that can provide sufficient energy to all tags over the entire area of interest. The key to this is to effectively model multipath in the environment, which would change the set of beamforming weights to search over. The approach for doing this is described later herein.

The method also needs to efficiently synchronize spatially distributed RFID readers without a shared clock between them. The key challenge here comes from the longer duration of RFID transmissions, over which packets can quickly lose phase synchronization. Further, RFID transmissions are narrowband, which makes time synchronization a challenge. The approach for handling the phase synchronization is also discussed later herein.

Blind Distributed Beamforming

The method of the invention for enabling a plurality of RFID readers with an arbitrary spatial distribution to find the optimal beamforming weights and to beam power to all RFID tags in their coverage area, including those beyond the range of any single reader, will now be described. This is achieved without any initial response from the RFID tags and without prior knowledge of their initial locations and orientations. For purposes of explanation of the invention, it is assumed that all RFID readers experience no time, carrier frequency and phase offsets, although, in reality, these offsets must be compensated for. The issue of synchronizing distributed RFID readers is discussed later herein.

Beamforming on both Downlink and Uplink—The method of the invention seeks to amplify the received signal power from RFID readers to the tags and vice-versa. Specifically, because RFIDs operate on RF-backscatter, and owing to channel reciprocity, beamforming weights used on the transmit chain to power tags on the downlink can also be used to amplify their received signals on the uplink.

Here it will be explained how the invention beamforms enough energy to detect an RFID tag. Once the response of the RFID tag is received, the reciprocal channel can be used to obtain the optimal beamforming vector to maximize data rate to that tag in future transmissions. As a result, formulations that maximize the energy required by the RFID over the entire space are favored, as opposed to focusing on individual tags.

Figure 1:
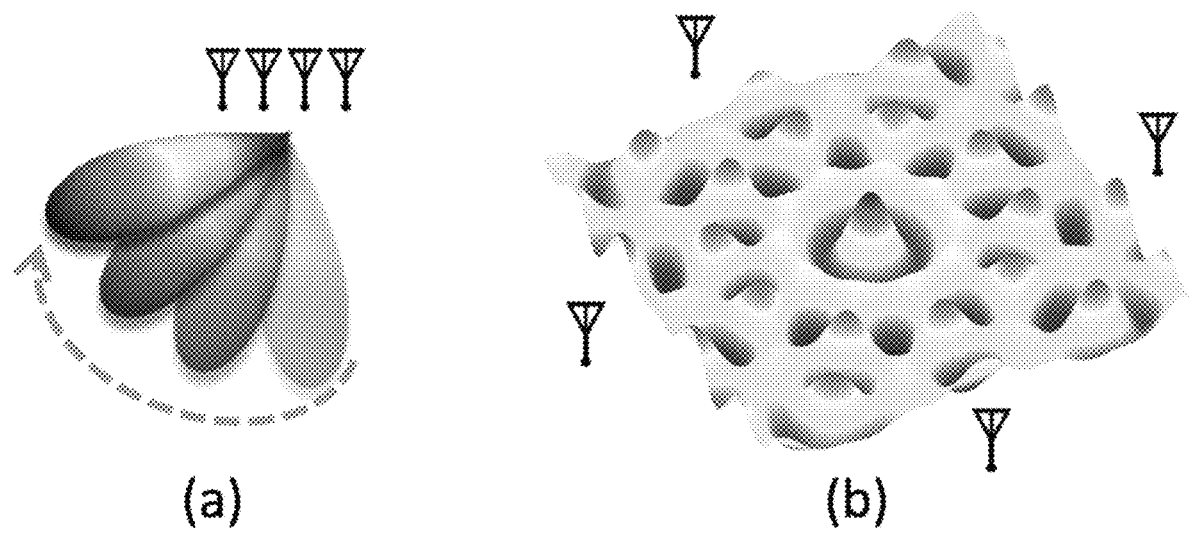
FIG. 1 shows the energy per pattern of traditional multi-antenna beamforming wherein a beam forms towards a particular direction (a), and the energy distribution of the present invention showing disputed MIMO beams that create multiple energy peaks and troughs over an area of interest, resulting in a complex energy distribution (b).

Given that the RFID readers are spatially distributed, forming an arbitrary geometry relative to each other, the beamforming weights distribute energy over the area of interest in very complex patterns, making it a challenge to find weights that both cover the entire area of interest with sufficient energy and which also minimize overlap of the vectors. To better understand how different beamforming weights from a distributed array of readers impact the distribution of energy over the area of interest, refer to FIG. 1(b). Consider four transmitters in the corners of a square with a 1 m diagonal length. For simplicity, consider that the transmitters are in 2D free space and use standard wireless channel models. A first beamforming weight is applied that allows signals from the transmitters to add up coherently at the center of the square. The distribution of energy over the entire 2D space around the square encompassing the transmitters in shown in FIG. 3(a). Note that, while the center of the square receives maximum energy (denoted by bright yellow), there are multiple spots around the center that are also energized with a similar received signal strength. This shows that applying beamforming weights in a distributed array also focuses energy on unintended points in the space. This means that simply iterating beamforming weights to focus on individual points in the space would lead to much unwanted overlap which would be grossly inefficient. Therefore, the invention seeks to minimize overlap between the energy patterns of the applied beamforming weights.

Based on the above observation, the core optimization problem that seeks to find the smallest group of beamforming vectors which energizes the entire area of interest with minimum overlap between them can now be formulated. The system cannot rely on any feedback from RFID tags in the environment, given that none of them may have sufficient energy to respond. As a consequence, there is no prior information on the nature and extent of multipath in the environment. Therefore, for purposes of this discussion it is assumed that line-of-sight paths to RFID readers dominate all other paths.

At a high level, the approach of the present invention shows that choosing the optimal set of beamforming vectors is analogous to a well-known combinatorial problem: the weighted set coverage problem. To see how, imagine that the 3D space is divided into a grid of discrete 3D blocks. Each beamforming vector effectively supplies sufficient energy to RFIDs in some subset of these blocks. The goal is to find the smallest set of such beamforming vectors whose union is the universal set of all blocks in the grid. This is analogous to the weighted set cover problem, which seeks to find the smallest number of sets, each containing a few integers in the range 1, N whose union is precisely the universal set $\{1, 2, \ldots, N\}$. Given that weighted set cover is an NP-complete problem, an efficient approximation algorithm is used here, while presenting various optimizations to reduce algorithmic complexity.

Mathematically, assume that the space of beamforming vectors has n discrete elements $B=\{B_1, \ldots, B_n\}$, and the goal is to cover m discrete points in the space spanning the desired coverage area denoted by $G=\{G_1, \ldots, G_m\}$. Let the variable $u_{i,j}$, $i=1, \ldots, n, j=1, \ldots, m$ be one of the beamforming vectors $B_i$ providing energy to the point in space $G_j$. Given that the L reader locations are known and no information on multipath is available, $u_{ij}$ can be determined as follows:

$$u_{ij} = \begin{cases} 1, & |B_i h_j|^2 > \tau \\ 0, & \text{otherwise} \end{cases} \quad (1)$$

where:

$$h_j = \left[\frac{1}{d_{lj}} e^{-2\pi\sqrt{-1}\frac{d_{lj}}{\lambda}}, \; l=1, \ldots, L\right] \quad (2)$$

where:
$h_j$ is the vector of wireless channels from readers to grid point j;
$\lambda$ is the wavelength;
$d_{lj}$ is the distance between the $l^{th}$ reader and the $j^{th}$ grid point; and
$\tau$ is the minimum received energy required to energize an RFID tag.

The objective is to find the smallest set of beamforming vectors that spans all m points in G. This can be stated mathematically as the following integer linear program based on the variable $x_i$ which is 1 if and only if the $i^{th}$ beamforming vector is included in the optimal set:

$$\min \sum_{i=1}^{n} x_i \quad (3)$$

$$\text{s.t.} \sum_{i=1}^{n} x_i u_{ij} \geq 1 \; \forall \, j \in \{1, \ldots, m\}$$

$$x_i \in \{0, 1\} \; \forall \, i \in \{1, n\} \quad (4)$$

The above formulation directly resembles the well-known weighted set cover problem, which processes a group of sets to find the smallest sub-collection for which the union is also the union of the original group of sets. While this problem is known to be NP-complete, a reasonable polynomial-time approximation algorithm is to relax the above integer-program formulation into a linear program (LP). Specifically, by replacing Eq. (4) with:

$$0 \leq x_i \leq 1 \; \forall i \in \{1, \ldots, n\} \quad (5)$$

The optimization problem is solved using standard linear programming to obtain the optimal set $\{x^*_1, \ldots, x^*_n\}$. The chosen set of beamforming weights is then output by applying randomized rounding on the beamforming weights. This technique interprets the fractional part of the solution to the linear program as a probability distribution and then selects a solution by sampling this distribution. Randomized rounding is known to return a set of beamforming weights that is a valid set cover with probability at least ½. Mathematically, to bound the probability, let $\rho$ be a constant that satisfies:

$$e^{-\rho \log n} \leq \frac{1}{4n}.$$

Then, randomized rounding proceeds for exactly $\rho \log n$ iterations, and, in each iteration, it picks the $i^{th}$ beamforming weight with probability dictated by its respective solution $x_i$ to the linear program.

Prior work has shown that the above approximation algorithm results in a set of beamforming vectors whose size is within a factor O(log n) of the optimum. This implementation uses the Ellipsoid LP-solver with a worst-case complexity of $O(n^4)$, where n is the number of discrete beamforming vectors the algorithm optimizes over.

To reduce the complexity and search space n, the number of beamforming weights that the invention considers in its optimization must be reduced. The key insight to this end is that, while a large number of beamforming vectors are available, not all are created equally. To see why, revisit the example of the energy pattern from a beamforming vector that focuses energy at the center of a square in FIG. 3(a). The beamforming vector of one of the transmitters can be slightly perturbed by choosing one of the transmitters and adding $\frac{2}{3}\pi$ to its phase. The updated energy pattern in shown in FIG. 3(b). Each local maximum of energy moves in different, complex ways. This is precisely why the optimization algorithm above is needed to minimize overlap. Additionally, the size of each energized region changes with maximum diffusing energy over wider spots. In practical terms, this means that the same amount of energy is spread out over a wider area than in the previous case. Spreading energy over a wider space is good in that RFID tags over a wider region can be covered by a single beamforming weight. However, spreading energy too thinly over a wide area is likely to make the energy per unit area insufficient to activate the RFID tags in that area. Indeed, the most ideal beamforming weights are those that diffuse energy in a "Goldilocks zone" between these two extremes.

Therefore, the invention must favor beamforming weights with maximal total area where RFID tags remain powered. The invention therefore aims to search over beamforming weights that meet the above criterion of maximizing area-of-coverage for RFID tags. The approach begins with n beamforming weights chosen randomly, where n is dictated by available computing power. For each beamforming weight, incremental phase shifts are made and the gradient of net increase in coverage area is measured. A gradient-based optimization that favors phase shifts which maximize coverage area is then applied. The algorithm shown in FIG. 4 summarizes the approach. The above set of n beamforming weights is then fed into an optimization algorithm to find the optimal set.

There are a few design choices which are possible. First, to finely divide space, the invention must choose a plurality of discrete points G in the space to capture the area covered by a beamforming vector. Choosing too few would lead to coverage holes, while choosing too many would waste computation. The invention therefore samples the space at an interval empirically measured to be below the minimum distance between two adjacent energized regions across beamforming vectors in B. As empirically discovered, this corresponds to a sampling distance of $\lambda/3$.

Second, to pick the energy threshold, the invention chooses the threshold $\tau$ empirically by measuring the smallest amount of energy needed for an RFID tag to respond at its smallest data rate. Once the RFID tag is detected, future transmissions can use the reciprocal channel measurements from this tag to speed up data rates. It should be noted that $\tau$ must be calibrated conservatively to support all RFID tag models in the space.

The invention explicitly accounts for the antenna gain of the reader and polarization across spatial directions by applying a weight to each term of Eq. (2): $\alpha_{ij}$, which captures the attenuation in the $l^{th}$ base station antenna when it faces the $j^{th}$ grid point. The orientation of the tag is accounted for by setting $\tau$ conservatively to the smallest amount of energy for a tag to respond should it be oriented most unfavorably relative to the readers.

Figure 5:
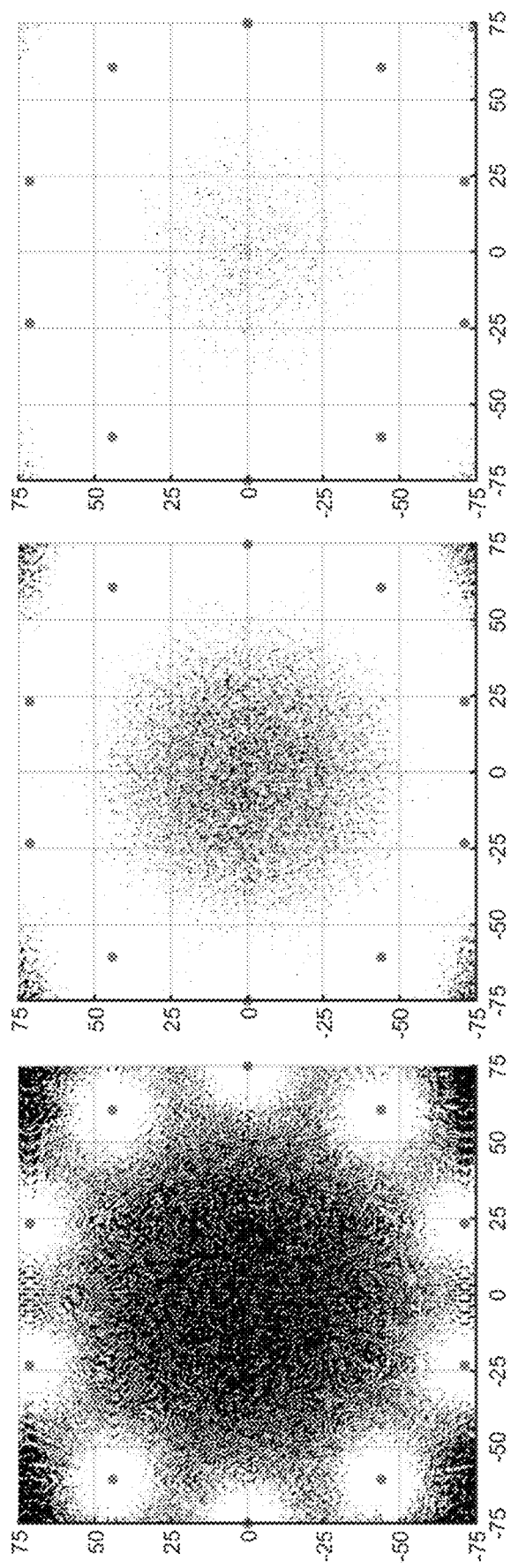
FIG. 5 shows a simulation of 10 transmitters deployed in a circle with a radius of 75 m. The plots represent energized pattern with 1 (a), 330 (b) and 450 (c) beamforming vectors respectively.

The run-time of the invention is primarily bottlenecked by the slow beamforming switch time of transmitters (approximately 4.5 ms for the hardware used in the proof-of-concept implementation) as opposed to computation. The run time depends directly on the final number of beamforming vectors that must be iterated over. This depends on the size of the space, placement of base stations and multipath scenarios. To get a sense for expected run time, ten RFID readers in a circle of radius 75 m were simulated, as shown in FIG. 5. Considering a threshold of RSSI>-12.8 dBm for the RFID tags to respond, without the method of the present invention, only 33% of the total area of interest is covered. However, after only 450 iterations nearly 97% of the area is covered by the present invention. This maps to a total time of 2.0 s for 97% coverage.

Figure 3:
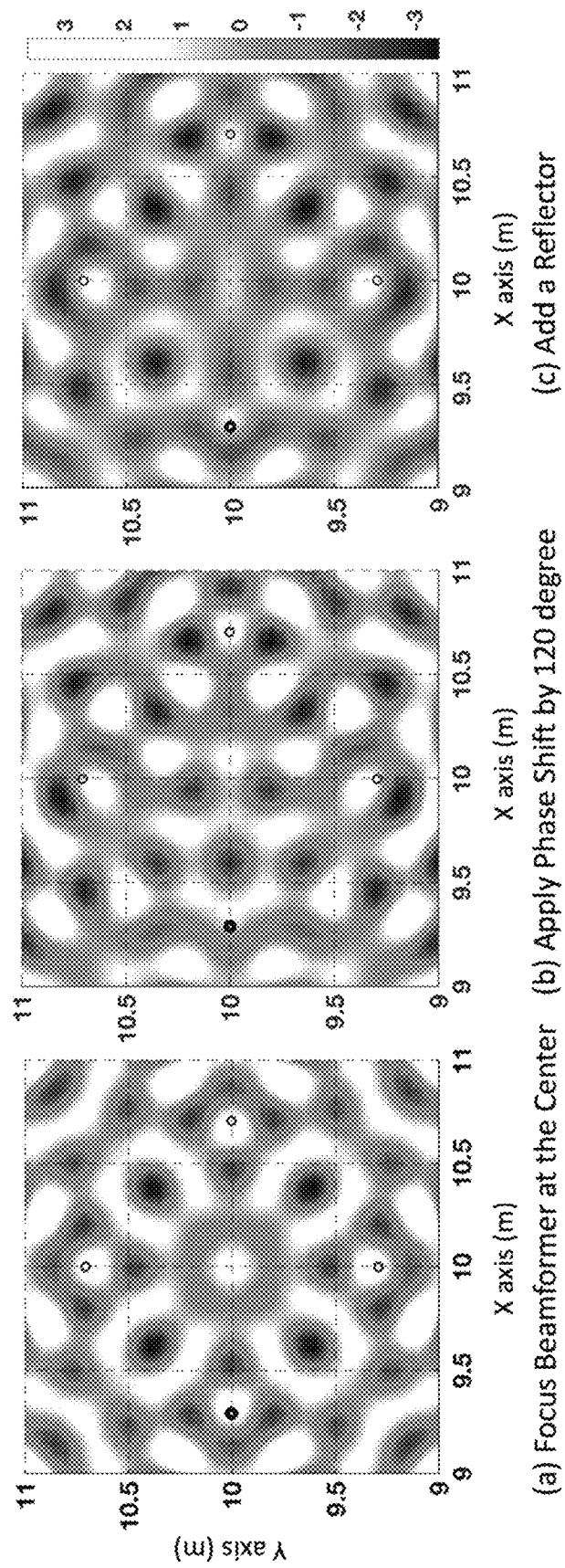
FIG. 3 are diagrams showing energy patterns of four transmitters when various parameters are varied.

The approach of the invention so far arrives at a static set of beamforming weights. However, the invention can benefit from the new information in the channel response of RFID tags, as they are detected. In particular, the optimal set of beamforming vectors can be impacted by the extent and nature of multipath Accounting for Multipath—While the preceding discussion has considered only free space, the presence of multipath can significantly change the set of beamforming weights to efficiently search over a given area. To see why, the example in FIG. 3(a) is revisited, by adding a strong reflector. The energized regions of space are re-evaluated and are shown in FIG. 3(c). Note that the resulting energy heatmap varies considerably from the free-space heatmap, both in the number, size and placement of the hotspots. Also note that the same set of reflectors can influence the energy perceived at different tags differently. As a result, the invention must account for multipath given its impact on the optimal set of beamforming vectors.

The high-level approach uses the responses from RFID tags in the environment that are progressively detected. In the absence of any response there is no information about multipath to work with, and therefore a free-space channel is assumed. As responses from RFID tags are collected, information regarding the location and orientation of dominant reflecting surfaces in the environment progressively computed. This information is then used to update the optimization algorithm. Specifically, the energy patterns corresponding to the beamforming weights are modified.

Figure 6:
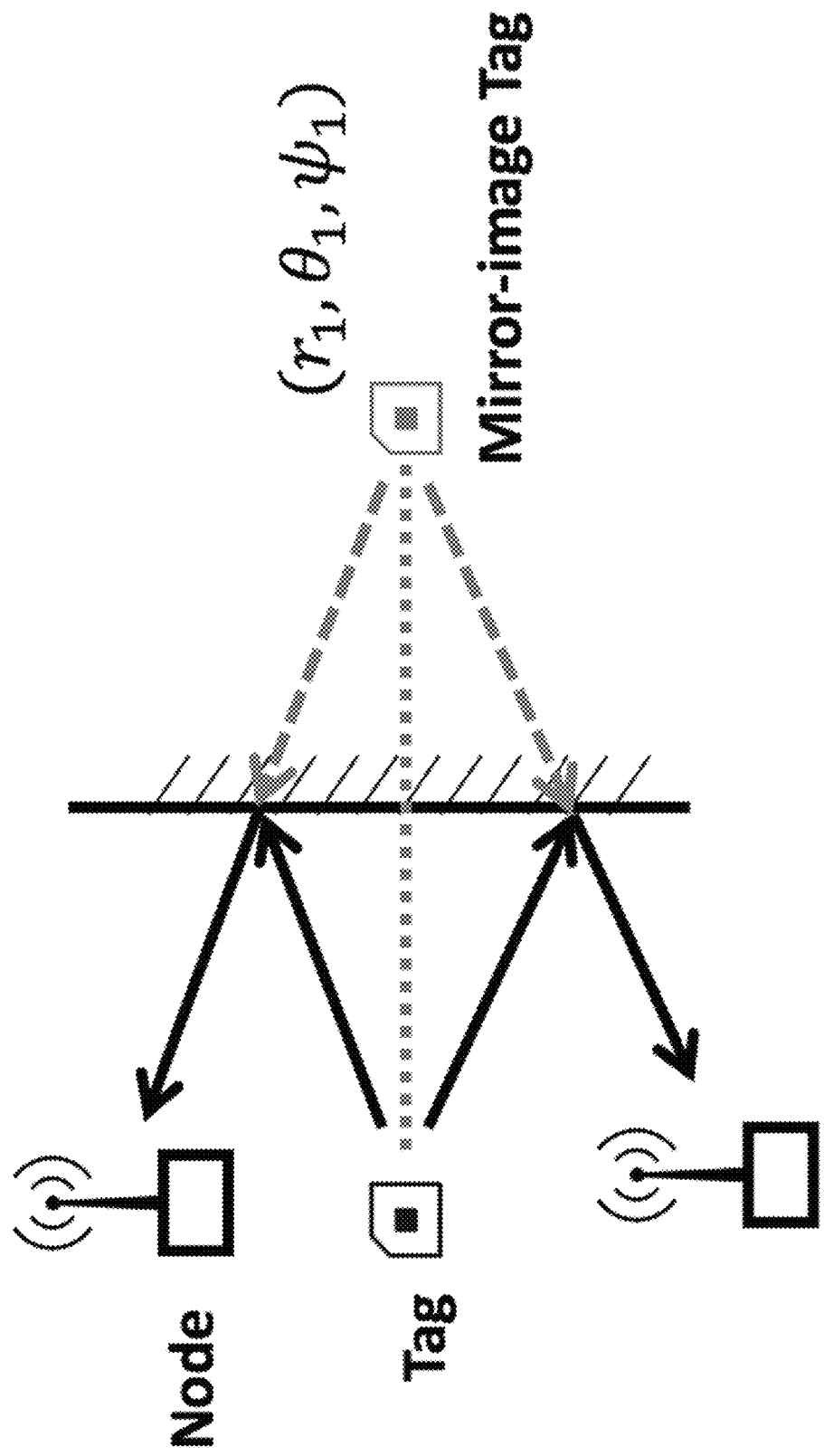
FIG. 6 is a diagram showing how a reflective surface can be modeled by a virtual source representing the mirror image of an RFID tag about the reflective surface.

To compute the location of dominant reflectors, the MUSIC algorithm is adapted while accounting for the arbitrary geometry of the RFID readers. Specifically, the algorithm takes as input wireless channels along the various frequencies of operation of an RFID tag (note that RFID tags naturally hop through a range of frequencies in the 900 MHz ISM band). It then measures the polar coordinates: (r, θ, ϕ) representing the mirror-image of the RFID tag along dominant reflectors by measuring the power of the received signal P(r, θ, π) of signals received from these coordinates. This is shown graphically in FIG. 6. Mathematically, this is represented as:

$$P(r, \theta, \phi) = \frac{1}{|a(r, \theta, \phi)^\dagger E_n E_n^\dagger a(r, \theta, \phi)|} \quad (6)$$

-continued where $$a(r, \theta, \phi) = [e^{4\pi j|r-r_i|\cos(\theta-\alpha_i)\cos(\phi-\beta_i)/\lambda}]_{i=1,\ldots,N}$$

where:
$(r_i, \alpha_i, \beta_i)$ are the polar coordinates of the transmitters;
$\lambda$ is the signal wavelength;
j is $\sqrt{-1}$;
$E_n$ are the noise eigenvectors of $h_{obs}h^{\dagger}_{obs}$
$h_{obs}$ represents the vector of observed wireless channels of the tags; and
$O(\cdot)^{\dagger}$ is the conjugate-transpose operator.

The algorithm computes the top-s (in one embodiment, s=5) local maxima in $P(r,\theta,\phi)$ to define the set of polar reflector coordinates: $\{(r_k, \theta_k, \phi_k)\}$, k=1, . . . , s).

To include considerations of multipath into the optimization, the manner in which the energy patterns of beamforming weights change due to the reflecting surfaces is modeled. A ray-tracing model is used to account for how multipath changes received signal power. Mathematically, Eq. (2) is re-written in the definition of $u_{ij}$ as:

$$h_j = \left[\sum_{k=1}^{s} \frac{1}{d_{ljk}e^{-2\pi\sqrt{-1}d_{ljk}/\lambda}}\right], l = 1, \ldots, L \quad (7)$$

where:
$d_{ljk}$ represents the distance traversed by the ray emanating from base station l to grid point j when reflecting off reflector at coordinates $(r_k, \theta_k, \phi_k)$. This formulation effectively removes the free-space assumption in the optimization to explicitly account for ambient reflectors.

As new information about multipath emerges, how the new information impacts the coverage area of beamforming vectors used previously must be accounted for. The optimization must be modified to fill gaps in coverage caused by the multipath. Mathematically, denote $x^*_i$ as an indicator function on which beamforming weights were used previously. Then, Eq. (3) can be re-written as:

$$\sum_{i=1}^{n} x_i u_{ij} \geq 1 - \sum_{i=1}^{n} x^*_i u_{ij} \; \forall j \in \{1, \ldots, m\} \quad (8)$$

While the above formulation assumes reflectors impact all RFIDs in the coverage area equally, in practice, this may not be the case. Specifically, reflectors have a higher probability of impacting nearby RFID tags compared to RFID tags that are further away. Similarly, reflectors that were computed in the past may no longer exist at the same location and orientation in the future. To account for these effects, the exponential weighting method is employed to progressively reduce the contribution of reflectors to the optimization with increasing distance from the reflector or with the time elapsed since detection. Specifically, Eq. (7) can be re-written as:

$$h_j = \left[\sum_{k=1}^{s} \frac{w_k}{d_{ljk}e^{-2\pi\sqrt{-1}d_{ljk}/\lambda}}\right], l = 1, \ldots, L \quad (9)$$

where:
$w_k = f_1^{d_{ljk}} f_2^{t_k}$;
$f_2, f_2 < 1$ are constants (empirically set to 0.9 in one embodiment); and
$t_k$ is the time elapsed since the measurement of reflector k was made.

Distributed Synchronization for RFIDs

A classic challenge for distributed MIMO systems is the accurate time and frequency synchronization with multiple distributed RFID readers for coherent beamforming. The invention actively estimates and corrects for carrier frequency and timing offsets, which would otherwise cause transmissions across RFID readers to combine incoherently.

At a high level, past distributed MIMO systems for Wi-Fi use a primary-secondary architecture where multiple secondary transmitters attempt to transmit in-phase with a primary transmitter. Prior to transmitting each data packet, the primary sends a short beacon containing a known preamble. Secondary transmitters estimate their phase relative to this beacon to account for frequency offsets between the clock of the primary and their own clocks. In addition, secondary transmitters exploit the relatively wide bandwidth of Wi-Fi to estimate phase shifts due to timing offsets. Secondary transmitters then apply phase shifts compensating for these offsets when they transmit data packets in tandem with the primary transmitter. During the data packet transmission, small additional phase drifts can accumulate owing to residual time and frequency offsets. As the duration of packets is short, the slope of such phase drifts can be readily corrected for.

RFID tags bring two important challenges for distributed MIMO. First, RFID packets last for a much longer time (100×) than Wi-Fi packets, ensuring greater phase drift due to frequency offset. This is because RFID tags need to harvest enough energy to respond to the queries of the reader, and this takes more time as the distance between the RFID tags and readers increases. Second, RFID transmissions are narrowband (20 kHz), meaning that resolving timing offsets is extremely challenging.

To compensate for frequency offsets, the invention leverages the full-duplex nature of RFID readers. Specifically, each secondary cancels out its own signal to recover the signal from the primary reader. By measuring how the phase of the secondary reader drifts over time, the invention corrects for phase drifts that accumulate since the initial synchronization.

For simplicity, begin with the case of two RFID readers—one primary and one secondary reader. To achieve the initial phase synchronization, the MegaMIMO phase synchronization protocol, where the RFID secondary reader applies an initial phase shift to synchronize with the primary, is adapted. However, as frequency offset accumulates over time, the readers will notice that the phase of the master drifts. The invention forms a closed loop to compensate for residual frequency offsets. Specifically, the secondary RFID reader observes the change in phase from the primary over a time interval (t, t+Δt), where t is the most recent time of synchronization and Δt is the time elapsed since then. Should a change in phase of the primary be observed since then (i.e. phase (t+T)−phase (t)), the secondary applies the negative value of this phase offset to its own transmission. Note that this would, in effect, remove residual phase errors, allowing the two readers to combine their signals coherently at RFID tags. Further, note that, due to channel reciprocity, the same phase shifts would ensure coherent combining on both the downlink and uplink.

Scaling the above system beyond two readers is a challenge. This is because upon canceling one's own transmission, each reader would perceive a linear combination of all other readers in its vicinity and not that of the primary alone. This means that, should a phase drift occur simultaneously for multiple readers (which is likely), these readers would be misled by out-of-sync transmissions from the other readers. To make matters worse, some readers may be beyond the communication range of the primary and therefore may not be in a position to synchronize directly with the primary as the last resort.

Figure 7:
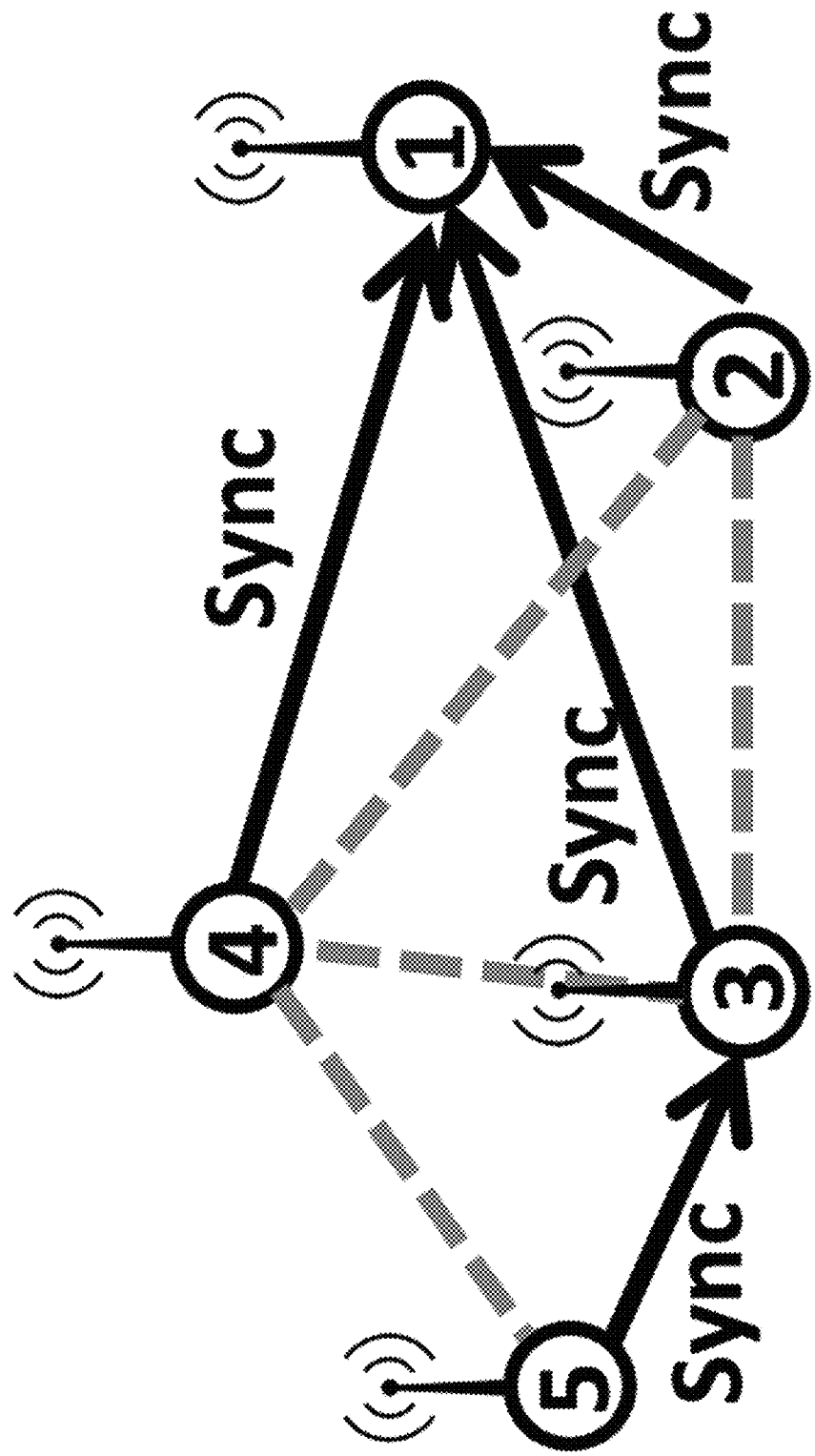
FIG. 7 is a diagram showing a spanning tree of the RFID readers in a distributed manner to guide synchronization.

To mitigate this problem, assign to each RFID reader a unique reference reader to which it may synchronize, should the primary not be within its vicinity. Specifically, assign indexes 1, ..., n to each RFID reader, where RFID reader 1 denotes the primary reader. Assume that these indexes are known by the readers and can be constantly broadcasted so that any reader that fails can be removed from consideration in the optimization. Each RFID reader synchronizes its phase relative to the neighbor with the smallest index. In effect, this synchronization scheme creates a spanning tree of RFID readers, as shown in FIG. 7, provided the graph of all readers is a connected one, which is assumed. This spanning tree is designed to ensure that all readers eventually synchronize to the root of the spanning tree, which is the primary RFID reader.

At this point, each secondary RFID reader subtracts its own signal and tracks the phase of the remaining linear combination. Should this change beyond a threshold, the RFID reader requests all its children and descendants in the spanning tree to cease transmission and then attempts to re-synchronize its transmission with the remaining active readers. The primary RFID reader never stops its transmission. It is easy to see that this scheme ensures that all secondary readers eventually transmit in-sync with the primary.

The invention also performs a two-step time synchronization process: a coarse synchronization to align symbols and a fine synchronization that leverages the phase of signals from the primary across frequency.

Secondaries are synchronized with the master using the known preamble of a Query command transmitted by the reader to initialize an inventory (coarse synchronization). To maximize time resolution, the secondaries receive this signal from the primary at a high sampling rate. The secondaries then apply correlation with the known preamble to obtain the index of the primary's signal. Only correlation coefficients above a pre-determined threshold are considered, to reject outliers (in one embodiment, the bottom 6% are rejected). This process is repeated over five preambles and the result with the maximum correlation coefficient is chosen.

To compensate for drift in timing offsets, the phase of signals from the master RFID reader as a function of frequency are exploited (fine synchronization). Specifically, recall that RFID transmissions hop between a wide range of frequencies in the 900 MHz ISM band spanning a total of 26 MHz. Each secondary RFID reader estimates the phase of signals, having subtracted its own signal, across frequencies. The invention then monitors for any change in the slope of the phase of this signal across frequencies between measurements. Specifically, recall that any time offset of $\Delta t$ between the two readers results in a frequency-dependent phase shift of $\Delta\phi = 2\pi f \Delta t$. As a result, the invention can estimate timing drifts by applying a least-squares linear regression of $\phi$ as a function of t and obtain the resulting slope m. Any drift in timing offset can simply be computed as $m/2\pi$ and corrected for. The invention can scale akin to frequency offset compensation above, for more than two readers in the network. Specifically, when any RFID reader goes out-of-sync in time, it informs all of its descendants to stop transmitting before attempting to re-synchronize.

In a preferred embodiment, the system is implemented on a main computer that calculates the optimal beamforming vector for each RFID reader. In one embodiment, each reader is connected to a local computer using a LAN cable. Each reader's local computer is, in turn, connected to the main computer via a wireless network (e.g., Wi-Fi). Once the main computer has calculated the optimal set of beamforming vectors, it distributes the appropriate vector to each computer to be transmitted via the connected RFID reader. Each RFID reader therefore serves as an RF front end. The actual transmission and reception of the radio signal from each reader requires a computer controllable via the LAN connection. Likewise, the data read from the RFID tags are sent to the main computer via the LAN connection. Other embodiments, comprising different hardware configurations, are also possible and are within the scope of the invention. For example, each distributed computer may be integrated with its respective RFID reader as a single unit.

Proof-of-Concept Implementation

The system was implemented on a testbed of USRP N210 software radios with SBX/WBX daughterboards operating as RFID readers. An omnidirectional and planar antenna was fed to the antenna ports of each node for full-duplex use. All readers are SISO, unless specified otherwise. Each USRP connects with an independent Jacksonlab Fury clock which could lead frequency and timing offset among the nodes. At the backend, each USRP was connected via Ethernet cables to a 64-bit Dell computer running Ubuntu 16.04. Dedicated socket-based TCP connections between the reader nodes was assumed. The RFID tags were commercial passive Alien Squiggle RFID tags. Using one reader antenna, a maximum range of up to 8.7 meters was measured.

The system software is fully implemented in UHD/C++ including beamforming and distributed synchronization. In addition, an in-house UHD/Gnuradio based C++ RFID emulator was used to decode signals from the tags. The set-cover based optimization was implemented in the cloud on a cluster of 64-bit core i7 Ubuntu machines and the optimal beamforming weights were reported to the reader nodes.

Figure 8:
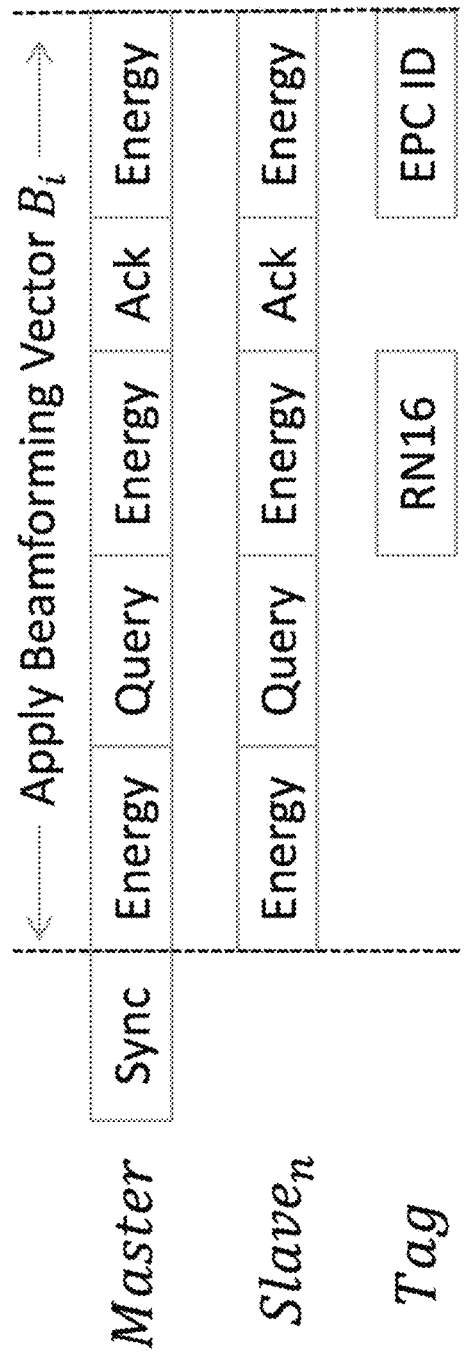
FIG. 8 is a chart depicting one round of a search for unknown tags. Without a tag response, another round is started by applying the next beamforming vector.

All RFID readers implement ASK modulation with PIE encoding to align with the specifications of the Gen2 RFID protocol. Apart from delivering energy, the readers also actively transmit messages which specify the tag's modulation format, encoding scheme and backscatter frequency. The RFID tags employ ASK modulation and FM0 encoding. The protocol flow of the system is shown in FIG. 8, which depicts one round of search for the unknown tags. Without a tag response, another round is started by applying the next beamforming vector $B_{i+1}$.

Figure 9:
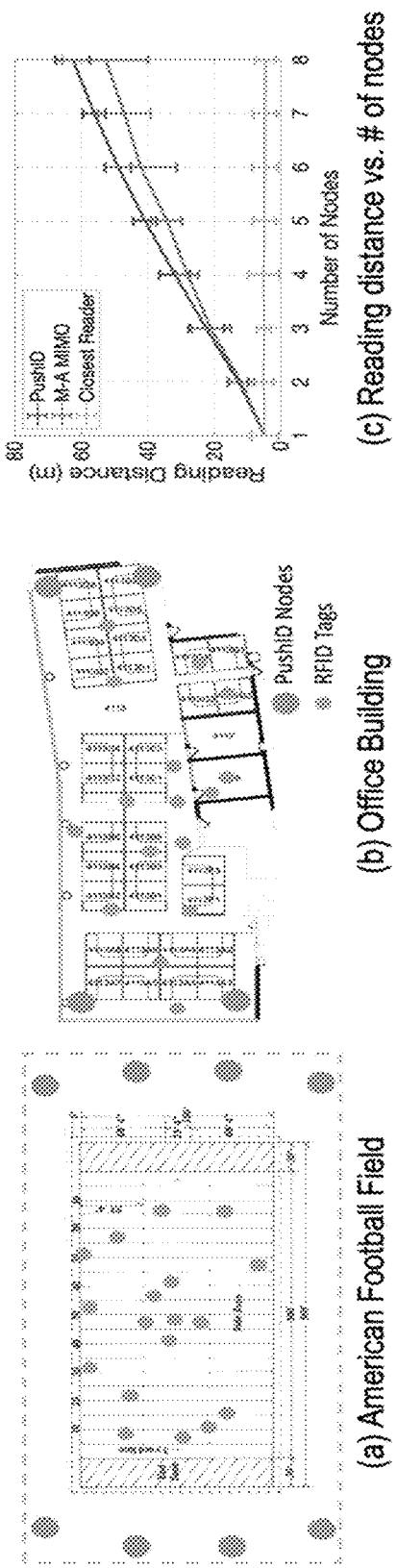
FIG. 9 shows an outdoor testbed deployed in a football field (a) and an indoor testbed deployed on a floor of an office building (b). Also shown is a plot showing the maximum reading range versus the number of readers (c).

The system was evaluated in two testbeds indoors and outdoors. For the outdoor testbed, the system was deployed around a football field (140×140 m) with 8 transmitters, as shown in FIG. 9(a). For the indoor testbed, four transmitters were deployed on a floor of an office building (20×40 m) covering multiple rooms and cubicles as shown in FIG. 9(b). Both testbeds are multipath rich due to stands and partitions in the former and cubicles and furniture in the latter blocking the direct path of some readers. The RFID readers were mounted in various positions including different elevations. RFID tags were placed in various positions and orientations facing towards different angles. FIGS. 8(a-b) show the candidate locations of RFID tags (represented by blue dots) and readers (represented by orange dots). Unless specified otherwise, all results incorporate an equal amount of data points (over 1000 RFID tag locations considered among them) from both testbeds with core results evaluating how system accuracy changes in line-of-sight vs. non-line-of-sight relative to all readers.

The system was compared against two competing schemes: (1) closest reader, which assumes that each reader independently decodes signals and each tag receives energy from the closest reader; and (2) multi-antenna MIMO, which assumes that all reader antennas are co-located and synchronized by an external clock. Unless specified otherwise, error bars in graphs denote standard deviation.

Test Results—Synchronization Accuracy

The accuracy of the system in achieving accurate frequency and time synchronization between readers was evaluated. One reader was designated as the primary and used by the system to synchronize the secondaries at high accuracy. The RFID readers were placed in various arbitrarily chosen geometries and different relative distances between the secondaries and the primary reader. Two quantities of interest were measured: (1) the error in time synchronization; and (2) the error in frequency synchronization of signals at a receiver that compares the phase of the signals received from the primary and secondaries post-synchronization. This experiment was performed in both of the previously-described indoor and outdoor testbeds, in which about half of the secondaries on average are non-line-of-sight relative to the primary and some secondaries (>50% of nodes >50 m away from primary) synchronize via multiple hops using the spanning tree approach described above.

Figure 10:
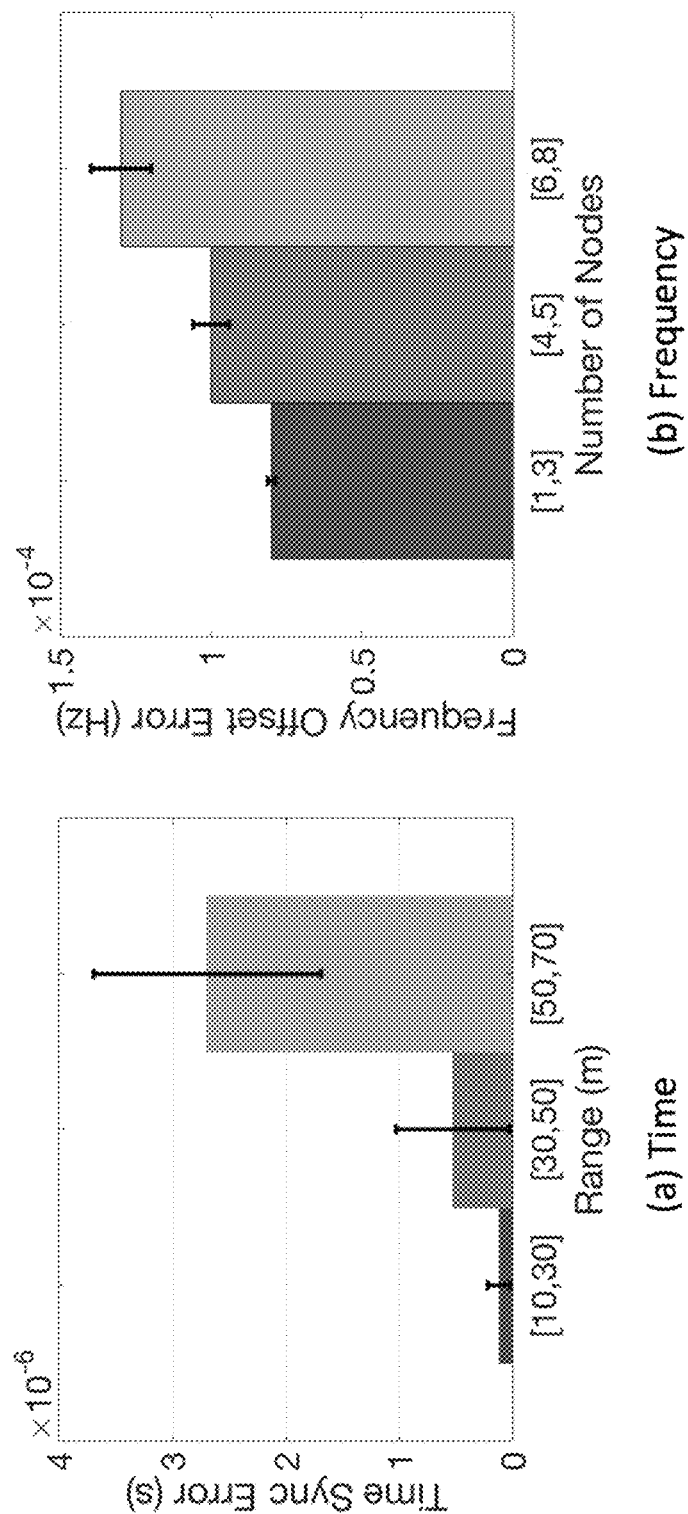
FIG. 10 are graphs showing time and frequency synchronization accuracy

FIG. 10(a) shows the mean and standard deviation (error bars) in accuracy of time synchronization for different ranges of distance between a secondary RFID reader and the primary. As expected, the mean error increases with increasing distance. The system achieves a mean error of 0.12, 0.53, 2.69 µs, with ranges of 10-30, 30-50 and 50-70 meters respectively. However, even the worst-case error is much smaller than one Nyquist time sample, given the narrow bandwidth of RFIDs (20 kHz). This means that the system is able to achieve the required level of time-synchronization accuracy to perform efficient distributed MIMO.

Next, FIG. 10(b) depicts the accuracy in frequency synchronization with an increase in the number of RFID readers in the network. As expected, the mean and variance of phase synchronization errors increase modestly as more readers join the network. The system is able to achieve a mean error of 0.0001 Hz in frequency offset overall across experiments. This error corresponds to a phase shift of 0.0005° over the duration of a typical RFID packet and therefore minimally impacts the throughput of the distributed MIMO architecture.

Test Results—Range vs. Number of Nodes

In this experiment, the maximum distance for a number of secondaries that can detect the response from the tag is evaluated. Up to eight RFID readers were deployed in various geometries (starting from co-located and with progressively increasing spacing) with tags placed such as to involve line-of-sight and non-line-of-sight relative to the readers. Neither the location nor the number of RFID tags placed in the environment were known beforehand to the readers. In aggregate, over 1000 RFID tag locations across experiments were considered. The distance between each RFID tag and its closest reader were noted. The experiments considered distances of up to 80 meters. The goal is to estimate the maximum distance at which an RFID tag can be detected at the readers.

FIG. 9(c) shows the maximum range of RFID tags with respect to the number of reader nodes (up to eight). As expected, the system amplifies the received signal power from RFID readers to the tags and vice-versa, the range of the system increases quasi-linearly as the number of RFID readers increases. The rate of increase does dip (gradually) with increasing number of readers due to the increasing impact of time and frequency synchronization errors. A surprising decreasing trend in the standard deviation with maximum distance is also shown. This stems from the system's robustness to orientation in the presence of multiple distributed readers, all oriented in diverse spatial directions. The results show that the system achieves a maximum range to an RFID tag of 64 meters, a gain of about 7.4× vs. commercial RFID and 20% over multi-antenna MIMO. The standard deviation of multi-antenna MIMO is large in various experimental settings. In contrast, the system has better resilience and stability across experiments which gives more spatial diversity that benefits the poor polarization sensitivity of the RFID dipole antennas.

Test Results—Throughput vs. Distance and Scale

In this experiment, the impact of the system on the throughput is evaluated as the number of RFID readers and the distance between the tag and its closest reader are varied. The throughput is measured by first measuring the SNR of each RFID tag measured from the eight RFID readers after coherently combining signals to and from the tag. The ESNR metric is adapted to the RFID context to estimate the maximum data rate achievable for the received SNR. Once the algorithm of the system is applied to detect a tag, channel reciprocity is used to maximize throughput to each detected tag. The system was deployed in both the outdoor (FIG. 9(a)) and indoor (FIG. 9(b)) scenarios and considers tags in both line-of-sight and non-line-of-sight relative to the readers. The RFID tags use FM0 modulation which allows for data rates over 45 kbps.

FIG. 11(a) shows the increase in throughput vs. distance in line-of-sight and non-line-of-sight settings and compares it against the baseline system that connects to the closest RFID reader. For the baseline, as expected, a reader has a maximum range of about 8.7 m across both line-of-sight and non-line-of-sight settings and performance drops to zero throughput beyond this distance. The invention, with a maximum range of 67.5 meter in line-of-sight and 58.9 meters in non-line-of-sight, significantly outperforms the baseline. Further, as expected, the throughput drops down as the distance increases due to lower signal-to-noise ratio. Quite significantly, the performance of the system with eight transmitters increases the throughput of RFID tags 2.6× when compared to the baseline closest-RFID reader scheme at its maximum range of about 8.7 m.

Test Results—Throughput vs. Number of Reader Nodes

With the increasing number of reader nodes, a gradual (logarithmic) increase in network throughput of covered RFID tags is observed. There is a similar, although much more modest increase with reader nodes for the baseline owing to an increase in coverage area. However, the system observes a net mean throughput gain of 2.6× over a network of 8-nodes over the baseline closest-reader system.

Impact of Orientation—In this experiment, the distribution of the throughput of an RFID tag is modeled progressively oriented along various directions in 100 locations with 8 readers and the present invention is compared with: (1) an 8-antenna MIMO scheme; and (2) the closest reader baseline.

FIG. 11(c) plots the CDF of throughput across schemes with changing tag orientation. The system outperforms both multi-antenna MIMO (by 1.54× median) and the closest reader baseline (by 7.4× median). This is because readers are oriented variously and therefore much more robust to change in orientations of the tags. In contrast, multi-antenna MIMO with co-located reader antennas loses performance when tags are oriented away from the MIMO reader.

Impact of Mobility—Two tags were deployed in the environment in the indoor testbed, each placed initially at the same 100 randomly chosen initial locations at varying distances (up to 60 m) from the closest reader: (1) static RFID tags; and (2) an RFID tag moved around at walking speeds. The performance of an 8-antenna MIMO embodiment and the closest reader baseline from eight RFID readers were measured and compared FIG. 12(C) plots the CDF of throughput across schemes for static and mobile tags. As expected, throughput dips in the presence of mobility across schemes. However, we note that the system achieves gains over the baseline despite mobility (1.6× for static and 1.4× for mobile over multi-antenna MIMO). The robustness of the system to mobility stems from two reasons: (1) The mobility of the RFID tag ensures that the tag is highly likely to move out of coverage holes. As a result, during its trajectory, the system has a higher likelihood of detecting the tag, compared to a static tag. This counteracts to help recover some of the loss in performance owing to changing multipath in the algorithms of the system. (2) Once the tag is first detected, the system can use channel reciprocity to rapidly continue beamforming to the tag and thereby respond to its mobility. However, mobility at very high speeds would significantly deteriorate the performance and gains of the system, just as it would deteriorate commercial RFID systems.

Convergence and Coverage—The convergence time of the algorithm of the invention and how it is impacted by the distance of RFID tags and its trade-off with total area covered is measured. The main computational bottleneck of the system is the rate at which beamforming weights can be applied by the USRP hardware, which was empirically found to be 4.5 milliseconds in the testbed. Convergence time is measured in terms of the number of beamforming vectors that need to be applied. Once again, the system was executed with RFID tags placed at a wide range of distances to the closest reader with eight RFID readers. FIG. 12(b) shows that the percentage of tags discovered increases with increasing number of beamformers for distances from the closest reader over 60 m. It is rare for the system to detect all tags, because some tags remain virtually undetectable due to their location, orientation or shadowing—a natural limitation of the system, previously discussed. Beyond 95% coverage, diminishing returns are observed upon applying more beamforming vectors. FIG. 12(a) shows the trade-off between the distance of the tag and the number of beamformers needed to find >95% of tags in the area. In the worst-case scenarios, at maximum distance, 980 beamforming vectors are needed (4.4 seconds for a USRP N210).

The present invention, comprising a system and method, is a novel distributed MIMO system to power commercial passive RFID tags. The invention utilizes a blind distributed beamforming algorithm to efficiently search through the space of beamforming vectors. It further utilizes a novel phase synchronization algorithm to synchronize distributed RFIDs. A detailed prototype evaluation on an eight-antenna distributed reader testbed reveals a 7.4× improvement in range compared to state-of-the-art commercial readers.

The invention claimed is:

1. A system comprising:
a plurality of RFID readers spatially distributed over an area of interest, the plurality of RFID readers executing a method comprising:
determining an optimal set of beamforming vectors that energize the area of interest with minimal energy sufficient to activate RFID tags in the area of interest, while minimizing overlap of the beamforming vectors;
applying the set of beamforming vectors in the area of interest;
discovering one or more RFID tags in the area of interest based on responses received from the applied set of beamforming vectors; and
receiving data from the discovered RFID tags by providing a beamforming vector to focus energy on the location of each discovered RFID tag;
wherein determining the optimal set of beamforming vectors comprises:
choosing a random set of vectors;
making incremental phase shifts to each vector;
for each incremental phase shift, measuring the gradient of net increase in coverage of the area of interest area; and
applying a gradient-based optimization favoring beamforming weights that maximize coverage area;
feeding candidate sets of beamforming weights into a set cover optimization;
applying randomized rounding to the plurality of weights and solving the set cover optimization using linear programming.

2. The system of claim 1 wherein receiving data from the discovered RFID tags comprises:
determining an optimal beamforming vector to deliver maximum energy and maximize data rate to the RFID tag using channel reciprocity; and
reading data from the RFID tag;
wherein data read from the RFID tag includes at least an identification of the RFID tag.

3. The system of claim 1 wherein the minimal energy sufficient to energize any RFID tags assumes that the RFID tags are oriented in a most unfavorable position relative to the plurality of RFID readers.

4. The system of claim 1 further comprising:
determining locations of one or more reflecting surfaces in the area of interest, based on responses from the one or more discovered RFID tags; and
modifying the set of optimal vectors to account for the one or more reflecting surfaces.

5. The system of claim 4 wherein locations of the one or more reflecting surfaces are located by modeling mirror images of known RFID tags about the reflective surface based on amplitude and phase port responses received from the known RFID tags.

6. The system of claim 5 wherein known RFID tags located closer to the reflecting surface are weighted higher when determining the optimal set of beamforming vectors than tags located further away from the reflecting surface.

7. The system of claim 1 wherein one of the plurality of RFID readers is designated as primary and the remainder of the plurality of RFID readers are designated as secondaries, and wherein the secondaries are synchronized to the primary.

8. The system of claim 7, wherein the synchronization is a phase synchronization comprising:
- assigning to each secondary, a reference reader comprising another secondary or the primary;
- wherein each secondary adjusts the phase of its transmitted signal to match.

9. The system of claim 8, wherein the synchronization is a time synchronization comprising:
- performing a coarse synchronization by receiving, at each secondary, a query command having a known preamble from the master and applying correlation with the known preamble to obtain a time index of the primary; and
- performing a fine synchronization by detecting changes in a slope of the phase of transmitted signals from the primary and correcting for the change in slope.

10. The system of claim 1 further comprising:
- a main computer;
- a plurality of distributed computers, each distributed computer in communication with one of the plurality of RFID readers;
- wherein each of the plurality of distributed computers is in communication with the main computer.

11. The system of claim 10 wherein each distributed computer is integrated with its respective RFID reader.

12. The system of claim 10 wherein each of the plurality of distributed computers is connected to its respective RFID reader via a LAN cable and further wherein each distributed computer is in communication with the main computer via a wireless connection.

13. The system of claim 12 wherein each RFID reader is controllable by the respective distributed computer to which it is connected via the LAN connection.

14. The system of claim 10 wherein the optimal set of beamforming vectors is calculated by the main computer and wherein applying the set of beamforming vectors in the area of interest comprises:
- communicating one of the optimal set of beamforming vectors to each RFID reader; and
- instructing each of the distributed RFID readers to transmit using its respective beamforming vector.

15. The system, of claim 14 wherein communicating one of the optimal set of beamforming vectors to each RFID reader comprises:
- sending respective beamforming vectors from the main computer to each distributed computer; and
- downloading the respective beamforming vectors from each distributed computer to the RFID reader to which it is connected.

16. The system of claim 10, further comprising:
- collecting data read from RFID tags by each of the plurality of RFID readers at each respective distributed computer to which the RFID reader is connected; and
- communicating the data from each distributed computer to the main computer.

* * * * *